(12) United States Patent
Collet

(10) Patent No.: US 11,679,666 B2
(45) Date of Patent: Jun. 20, 2023

(54) METHOD FOR DETECTING THE TRAPPING OR TWISTING OF A DISCHARGE PIPE

(71) Applicant: VITESCO TECHNOLOGIES GMBH, Hanover (DE)

(72) Inventor: Thierry Collet, Toulouse (FR)

(73) Assignee: VITESCO TECHNOLOGIES GMBH, Hanover (DE)

( * ) Notice: Subject to any disclaimer, the term of this patent is extended or adjusted under 35 U.S.C. 154(b) by 294 days.

(21) Appl. No.: 17/253,348

(22) PCT Filed: Jun. 17, 2019

(86) PCT No.: PCT/EP2019/065821
§ 371 (c)(1),
(2) Date: Dec. 17, 2020

(87) PCT Pub. No.: WO2019/243226
PCT Pub. Date: Dec. 26, 2019

(65) Prior Publication Data
US 2021/0260990 A1    Aug. 26, 2021

(30) Foreign Application Priority Data

Jun. 18, 2018    (FR) ...................................... 1855309

(51) Int. Cl.
*B60K 15/035* (2006.01)
*F16K 37/00* (2006.01)
*B60K 15/03* (2006.01)

(52) U.S. Cl.
CPC .... *B60K 15/03519* (2013.01); *F16K 37/0041* (2013.01); *B60K 2015/03302* (2013.01);
(Continued)

(58) Field of Classification Search
CPC .... B60K 15/03519; B60K 2015/03302; B60K 2015/03528; B60K 2015/03585;
(Continued)

(56) References Cited

U.S. PATENT DOCUMENTS 4,809,742 A * 3/1989 Grau ...................... G01B 7/003
324/207.16
5,311,903 A * 5/1994 Poulin .................. F02M 65/005
137/554

(Continued)

FOREIGN PATENT DOCUMENTS

WO     2011/116926     8/2011

OTHER PUBLICATIONS

International Search Report and Written Opinion of the ISA for PCT/EP2019/065821, dated Sep. 18, 2019, 12 pages.

*Primary Examiner* — Craig J Price
(74) *Attorney, Agent, or Firm* — Nixon & Vanderhye

(57) ABSTRACT

Disclosed is a method for detecting pinching or twisting of a discharge pipe connecting a fuel tank and an absorbent filter of an evaporation system of a motor vehicle. The method includes the steps, with the valve being initially in its closed position, of moving the valve by the gases circulating in the absorbent filter, of measuring, in the absence of control of the solenoid, the voltage generated at the terminals of the solenoid by the movement of the valve, and of detecting pinching or twisting of the discharge pipe when the voltage measured is between a first predetermined threshold and a second predetermined threshold.

20 Claims, 3 Drawing Sheets

(52) U.S. Cl.
CPC ............... *B60K 2015/03528* (2013.01); *B60K 2015/03585* (2013.01)

(58) Field of Classification Search
CPC ........... F16K 37/0041; Y10T 137/0396; Y10T 137/0452; Y10T 137/8242; Y10T 137/8225; Y10T 137/8326; Y10T 137/8359
USPC .............. 137/14, 15.11, 553, 554, 557, 559; 123/502, 506, 496–499; 251/129.01–129.22
See application file for complete search history.

(56) References Cited

U.S. PATENT DOCUMENTS

| | | | | |
|---|---|---|---|---|
| 6,657,847 | B1* | 12/2003 | Wright | H01F 7/1844 |
| | | | | 361/160 |
| 7,768,257 | B2* | 8/2010 | Lueck | G01B 7/14 |
| | | | | 324/207.16 |
| 7,845,337 | B2* | 12/2010 | Song | F02M 25/089 |
| | | | | 123/519 |
| 8,074,627 | B2* | 12/2011 | Siddiqui | F02M 25/0818 |
| | | | | 73/40 |
| 9,777,678 | B2* | 10/2017 | Dudar | F16K 37/0041 |
| 2004/0089275 | A1 | 5/2004 | Kidokoro et al. | |
| 2015/0167861 | A1* | 6/2015 | Ferrer Herrera | A01G 25/16 |
| | | | | 137/554 |
| 2017/0120745 | A1 | 5/2017 | Kim et al. | |

\* cited by examiner

METHOD FOR DETECTING THE TRAPPING OR TWISTING OF A DISCHARGE PIPE

This application is the U.S. national phase of International Application No. PCT/EP2019/065821 filed 17 Jun. 2019, which designated the U.S. and claims priority to FR Patent Application No. 1855309 filed 18 Jun. 2018, the entire contents of each of which are hereby incorporated by reference.

BACKGROUND OF THE INVENTION

Field of the Invention

The present invention lies in the field of motor vehicles and relates more particularly to a method and a system for detecting pinching of a pipe connecting an absorbent filter to a fuel tank of a motor vehicle.

Description of the Related Art

Nowadays, motor vehicles having a combustion engine have, in a known manner, an evaporation system connected to the fuel tank. Such a system makes it possible to discharge the fuel vapors that have accumulated in the tank. In order to prevent these polluting gases from being released directly into the atmosphere, it is known to mount a filter known as an "absorbent filter" (also known as a "canister") between the tank and the atmosphere, the absorbent filter being connected to the tank via a discharge pipe.

It is possible, however, for this discharge pipe to be pinched or twisted such that the polluting gases can no longer flow to the absorbent filter but remain trapped in the tank, and this can bring about an overpressure when the tank is filled with fuel. However, such an overpressure can block the fuel supply nozzle when the tank is being filled and can also cause a fraction of the polluting gases to be released into the atmosphere, this having major drawbacks. Therefore, it proves necessary to detect instances of pinching or twisting of the discharge pipe in order for it to be possible to overcome these problems.

A known detection solution consists in using a pump, for drawing out the gases contained in the tank, and a pressure sensor mounted in the fuel tank. Thus, in the absence of pinching or twisting of the discharge pipe, when the pump draws out the gases contained in the tank, the pressure measured by the sensor decreases. On the other hand, when the discharge pipe is pinched or twisted and the pump attempts to draw out the gases stored in the tank, the pressure measured in the tank will vary little or will not vary at all, indicating pinching or twisting. The addition and use of a pressure sensor mounted in the tank can prove complex and expensive, this having significant drawbacks for motor vehicle manufacturers. Therefore, there is a need for a solution that makes it possible to overcome these drawbacks at least in part.

SUMMARY OF THE INVENTION

To this end, a first subject of the invention is a method for detecting pinching or twisting of a discharge pipe connecting a fuel tank and an absorbent filter of an evaporation system of a motor vehicle, said method being notable in that, with said evaporation system comprising a pressure regulating device mounted between the absorbent filter and the outside of the vehicle and said pressure regulating device comprising a solenoid and a valve, said valve being configured to move between a closed position, in which it prevents the gases from passing through the pressure regulating device, and an open position, in which it allows the gases to pass from the tank or to the tank, the movement of the valve generating defining a voltage at the terminals of the solenoid when said solenoid is not controlled electrically, the method comprises the following steps:

with the valve being initially in its closed position, moving the valve by the gases circulating in the absorbent filter, for example during tank filling, measuring, in the absence of control of the solenoid, the voltage generated at the terminals of the solenoid by the movement of the valve, detecting pinching or twisting of the discharge pipe when the voltage measured is between a first predetermined threshold and a second predetermined threshold.

The method according to the invention makes it possible to detect, simply and effectively, pinching or twisting of the discharge pipe by analyzing the variations in the voltage defined at the terminals of the solenoid of the pressure regulating device when the valve thereof is not controlled. Specifically, with pinching or twisting of the discharge pipe reducing the flow rate of gas circulating in the pressure regulating device, this results in a simultaneous reduction in the amplitude of the movements of the valve and thus in the amplitude of the variations in voltage that are measured at the terminals of the solenoid. In particular, when such a pressure regulating device is already present in the vehicle, in particular in order to detect leaks in the evaporation system, it can thus be used to detect pinching or twisting of the discharge pipe, thereby simplifying the architecture of the vehicle. In particular, the invention makes it possible to avoid the use of a pressure sensor in the tank, thereby simplifying the vehicle and reducing the cost thereof.

Preferably, the first threshold is between −10 mV and −20 mV.

Also preferably, the second threshold is between +10 mV and +20 mV.

According to one aspect of the invention, the valve is configured to move when the pressure of the filtered gases is greater than or equal to 1 millibar or less than or equal to −11 millibar.

The invention also relates to a system for detecting pinching or twisting of a discharge pipe connecting a fuel tank and an absorbent filter of an evaporation system of a motor vehicle, said detection system comprising:

a control module, a pressure regulating device, mounted between the absorbent filter and the outside of the vehicle, comprising:

a solenoid, a valve configured to move between a closed position, in which it prevents the gases from passing through the pressure regulating device, and an open position, in which it allows the gases to pass from the tank or to the tank, the movement of the valve defining a voltage at the terminals of the solenoid when said solenoid is not controlled electrically, and a measurement module configured to measure the voltage at the terminals of the solenoid and to send these measurements to the control module, the control module being configured to receive the measurements taken by the measurement module during a movement of the valve from its closed position and to detect pinching or twisting of the discharge pipe when the measurements received are between a first predetermined threshold and a second predetermined threshold.

In a preferred embodiment, the regulating device is a natural vacuum leakage detection (NVLD) device.

Preferably, the first threshold is between −10 mV and −20 mV.

Also preferably, the second threshold is between +10 mV and +20 mV.

According to one aspect of the invention, the measurement module is mounted on the fuel tank of the vehicle, or integrated into the pressure regulating device or integrated into the control module.

According to another aspect of the invention, the valve is configured to move when the pressure of the filtered gases is greater than or equal to 1 millibar or less than or equal to −11 millibar.

The invention lastly relates to a motor vehicle comprising a detection system as set out above.

BRIEF DESCRIPTION OF THE DRAWINGS

Further features and advantages of the invention will become apparent from the following description, which is provided with reference to the appended figures, which are given by way of nonlimiting examples and in which the same references are given to similar objects.

DESCRIPTION OF THE PREFERRED EMBODIMENTS

Figure 1:
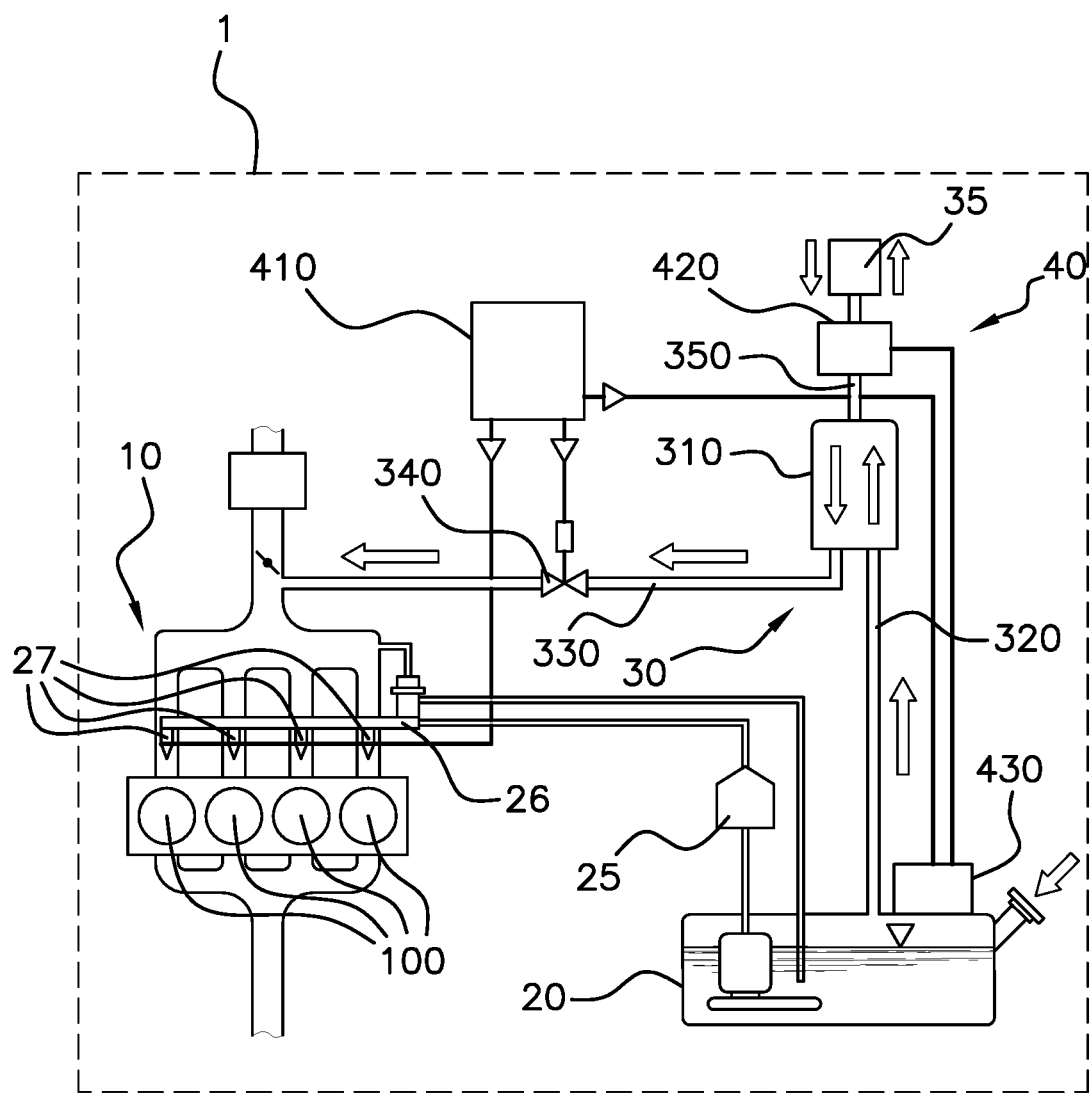
FIG. 1 schematically illustrates an embodiment of a vehicle according to the invention.

FIG. 1 shows a motor vehicle 1 comprising a combustion engine 10, a fuel tank 20, an evaporation system 30 and a detection system 40.

The combustion engine 10 (or internal combustion engine) comprises one or more hollow cylinders 100 each delimiting a combustion chamber into which a mixture of air and fuel is injected.

The fuel, for example gasoline, is stored in the tank 20, out of which it is drawn by an injection pump 25 in order to be conveyed, via an injection rail 26 and injectors 27, into the cylinders 100 of the engine 10.

Since the pressure of the gases contained in the tank 20 needs to be controlled in order to avoid any damage or accidents and to limit pollution caused by the fuel vapors, the vehicle 1 comprises an evaporation system 30, connected to the engine 10, to the tank 20 and to the outside of the vehicle 1 via an air filter 35, which makes it possible to absorb the vapors and convey them into the combustion chambers of the engine 10 in order to be burned therein, such that the gases discharged into the atmosphere are significantly purified of the polluting components.

The evaporation system 30 comprises an absorbent filter 310 (also known as a "canister"), an evacuation circuit 320, a purge circuit 330 in which a purge valve 340 is mounted, and a ventilation circuit 350.

The absorbent filter 310 is an active carbon filter, the function of which is to trap the pollutant fuel vapors coming from the tank 20. The evacuation pipe 320 is a pipe, made for example from plastic or rubber, that connects the absorbent filter 310 to the tank 20. The purge circuit 330 connects the absorbent filter 310 to the engine 10. The ventilation circuit 350 connects the absorbent filter 310 to the air filter 35. The purge circuit 330 and the ventilation circuit 350 may be in the form of pipes, made for example of plastic or rubber, or of rigid lines.

The detection system 40 makes it possible to detect leaks in the evaporation system but also pinching or twisting of the evacuation pipe 320, which could cause some of the polluting vapors to be released into the atmosphere, in particular during the filling of the tank 20 with fuel.

To this end, the detection system 40 comprises a control module 410, a pressure regulating device 420 and a measurement module 430.

Figure 2:
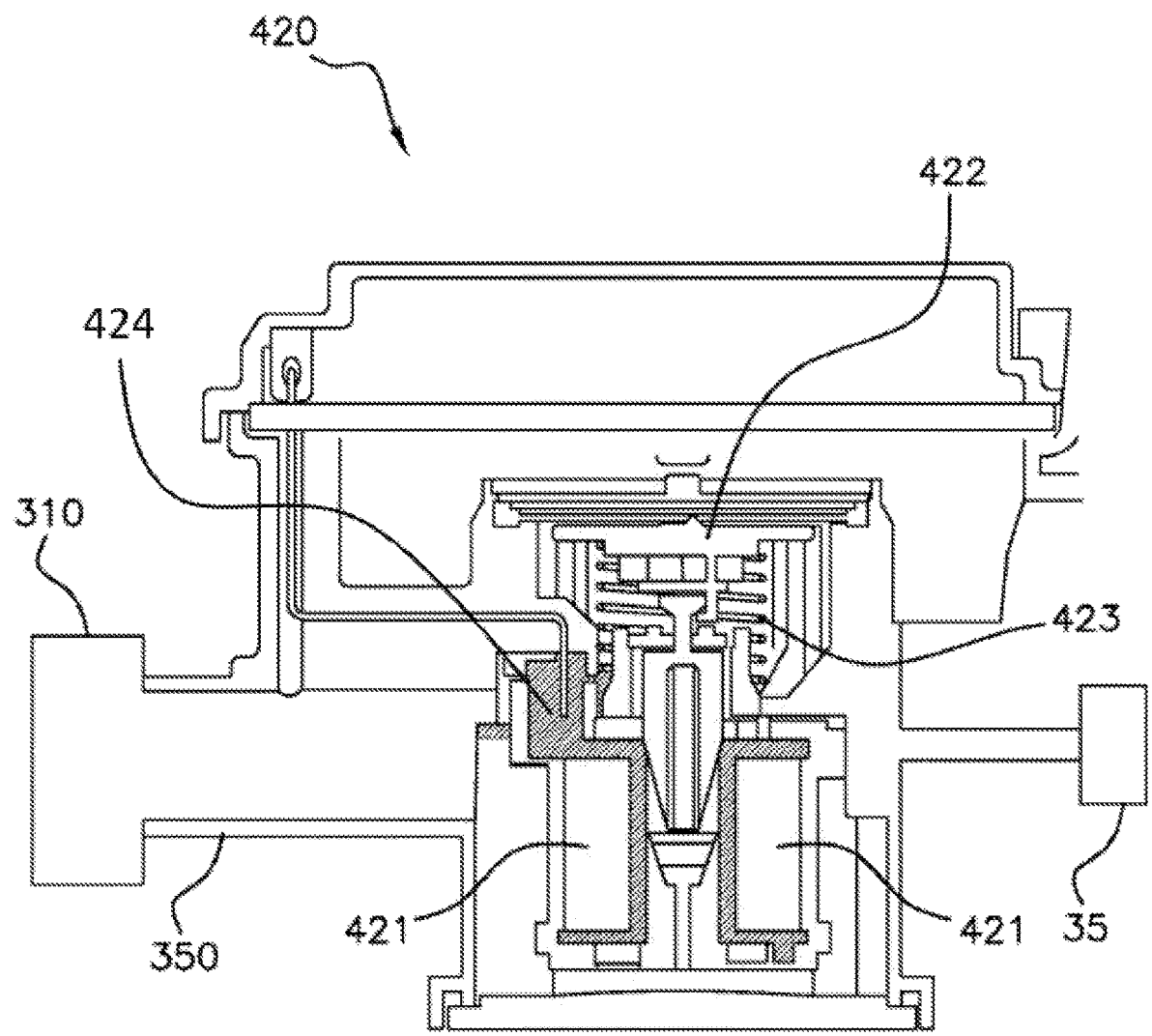
FIG. 2 schematically illustrates an embodiment of the pressure regulating device.

The pressure regulating device 420 is mounted in the ventilation circuit 350, between the absorbent filter 320 and the air filter 35, and comprises, with reference to FIG. 2, a solenoid 421 and a movable valve 422 connected to a spring 423. The pressure regulating device 420 may be an existing device, known as a natural vacuum leak detection (NVLD) device, that is used to regulate the pressure and detect leaks in the evaporation system 30, in a manner known per se.

In this example, the valve 422 is configured to move between a closed position, in which it prevents the gases from passing through the pressure regulating device 420, and a plurality of open positions, in which it allows the gases to pass through the pressure regulating device 420.

The solenoid 421 may be controlled electrically by the control module 410 so as to open or close. When the solenoid 421 is not controlled electrically by the control module 410, the movement of the valve 422 by a flow of gas coming from the absorbent filter 310 generates a current in the solenoid 421. In particular, when an operator fills the tank 20 with fuel, the fuel vapors are discharged toward the absorbent filter 310 and the gases filtered by said absorbent filter 310 move the valve from its closed position to an open position at a greater or lesser distance from the closed position depending on the pressure and the flow rate of the gases. In the process, the movement of the valve 422 generates a current in the solenoid 421, the voltage of which that is induced at its terminals 424 can be measured by the measurement module 430.

The measurement module 430 is thus configured to measure the voltage induced at the terminals 424 of the solenoid 421 and to send these measurements to the control module 410 to which it is connected via a communication link, for example via a communication network of the proprietary or LIN type, well known to a person skilled in the art, that connects the electrical equipment of the vehicle 1.

In the embodiment described, the measurement module 430 is mounted on the tank 20 and can in particular carry out further functions. For example, the measurement module 430 may also comprise a temperature sensor for measuring the internal temperature of the tank 20. In a variant, the measurement module 430 could be incorporated in the pressure regulating device 420 or directly in the control module 410.

The control module 410 is configured to receive the measurements taken by the measurement module 430 during a movement of the valve and to detect pinching or twisting of the discharge pipe 320 when the measurements received are between a first predetermined threshold and a second predetermined threshold.

In the embodiment described, the control module 410 is also connected to the injectors 27 in order to control the injections of fuel and to the purge valve 340 in order to close it or open it when it is necessary to convey the polluting vapors retained in the absorbent filters 310 toward the cylinders 100 of the engine 10 in order to burn them.

Thus, in this example, the control module 410 is implemented by the engine control computer of the vehicle 1. However, it will be noted that the entity that receives the measurements of the intensity of the current circulating in the solenoid 421, for the one part, and the entity that controls the injectors 27 and the purge valve 340, for the other part, could be two separate physical entities.

The implementation of the detection system according to the invention will now be described with reference to FIGS. 3 to 5.

The detection of pinching or twisting of the discharge pipe 320 requires, as a prerequisite, that the valve 422 be in the closed position. This configuration can be obtained for example when the control module 410 effects the closure of the valve 422 and causes the generation of negative pressure in the tank 20 by virtue of the control of the purge valve 340, or when the control module 410 is switched off. In this case, the detection of pinching or twisting of the discharge pipe 320 can be carried out at different times, such as, for example, during leak detection or during filling of the tank 20.

Thus, in a test for detecting pinching or twisting of the discharge pipe 320, with the valve 422 being initially in its closed position, circulation of the gases from the absorbent filter 310 to from the tank 20 to the absorbent filter 310 causes filtered gases to circulate through the pressure regulating device 420, which moves the valve 422 to an open position, in a step E1, and then back into the closed position as soon as the gases stop circulating through the pressure regulating device 420.

The movement of the valve 422 generates a current in the solenoid 421, the intensity of which is measured by the measurement module 430 in a step E2.

The intensity measurements taken by the measurement module 430 are sent in real time to the control module 410, which analyzes them.

Figure 3:
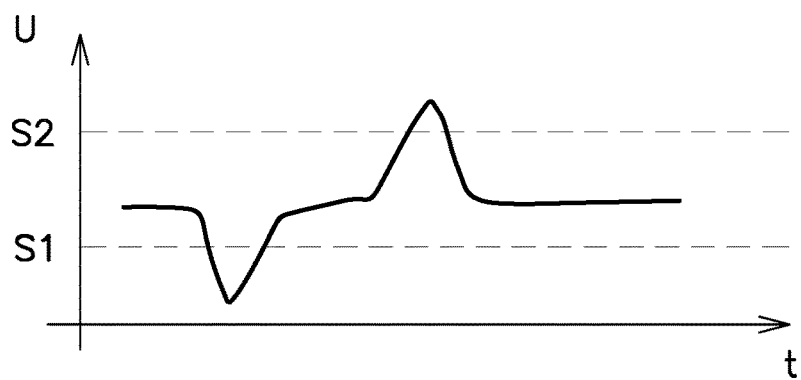
FIG. 3 schematically illustrates an example of variation in the voltage at the terminals of the solenoid of the pressure regulating device in the absence of pinching or twisting of the discharge pipe.

More specifically, in the absence of pinching or twisting of the discharge pipe 320, the opening and then closing movement of the valve 422 will be greater since the flow of gas circulating is not limited by the restriction of cross section caused by the pinching or twisting of the pipe, and this will generate, as illustrated in FIG. 3, a current in the solenoid 421 defining a voltage U at the terminals 424 of said solenoid 421, the value of which will first of all drop below a first threshold S1 (low) during the movement of the valve 422 into the open position and will then exceed a second threshold S2 (high) during the return of the valve 422 into the closed position. In other words, in the absence of pinching or twisting of the discharge pipe 320, the oscillation of the valve 422 will be significant and the value of the voltage U measured at the terminals 424 of the solenoid 421 will drop below the first threshold S1 and will then exceed the second threshold S2.

Figure 4:
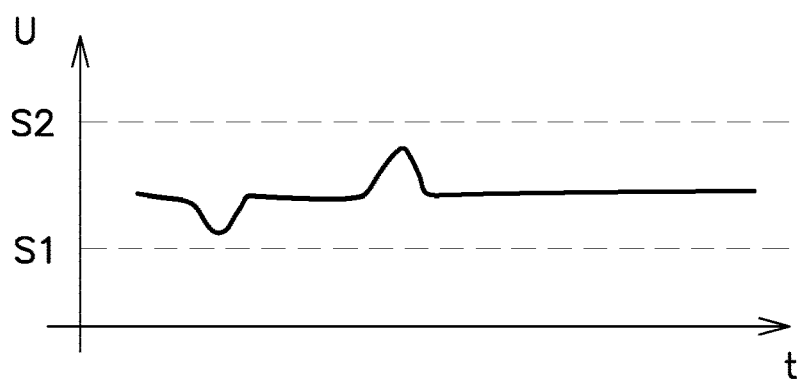
FIG. 4 schematically illustrates an example of variation in the intensity of the current in the solenoid of the pressure regulating device in the presence of pinching or twisting of the discharge pipe.
Figure 5:
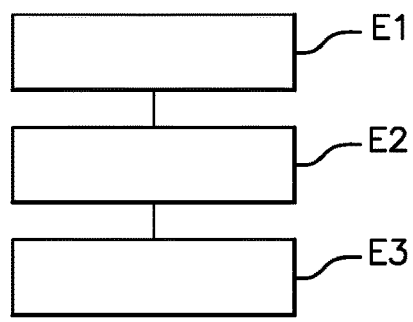
FIG. 5 schematically illustrates an embodiment of the method according to the invention.

On the other hand, in the presence of pinching or twisting of the discharge pipe 320, the amplitude of the opening and then closing movement of the valve 422 will be smaller, and this will generate, as illustrated in FIG. 4, a current in the solenoid 421 defining a voltage U at the terminals 424 of said solenoid 421, the value of which will not drop below the first threshold S1 during the movement of the valve 422 into the open position, nor will it exceed the second threshold S2 during the return of the valve 422 into the closed position. In other words, in the presence of pinching or twisting of the discharge pipe 320, the oscillation of the valve 422 will be less significant than in the absence of pinching or twisting of the discharge pipe 320 and so the value of the voltage U measured at the terminals 424 of the solenoid 421 changes strictly between the first threshold S1 and the second threshold S2. Thus, the control module 410 detects, during a step E3, pinching or twisting of the discharge pipe 320 when the voltage U measured at the terminals 424 of the solenoid 421 during the movement of the valve 422 varies between the first threshold S1 and the second threshold S2 without ever dropping below said first threshold S1 or passing above said second threshold S2.

The method according to the invention therefore makes it possible to determine, in a simple, quick and reliable manner, the presence of pinching or twisting of the discharge pipe 320, in particular by using existing equipment (the pressure regulating device 420) that is initially used to regulate the pressure in the evaporation system 30 and/or to detect leaks in said evaporation system 30.

The invention claimed is:

1. A method for detecting pinching or twisting of a discharge pipe connecting a fuel tank and an absorbent filter of an evaporation system of a motor vehicle, said evaporation system including a pressure regulating device mounted between the absorbent filter and the outside of the vehicle, said pressure regulating device including a solenoid and a valve configured to move between a closed position, in which the valve prevents the gases from passing through the pressure regulating device, and an open position, in which the valve allows the gases to pass from the tank or to the tank, movement of the valve generating a current defining a voltage at terminals of the solenoid when said solenoid is not controlled electrically, the method comprising:
  moving the valve that is initially in the closed position, by the gases circulating in the absorbent filter;
  measuring, in an absence of control of the solenoid, the voltage generated at the terminals of the solenoid by the movement of the valve; and
  detecting the pinching or the twisting of the discharge pipe when the measured voltage is between a first predetermined threshold and a second predetermined threshold.

2. The method as claimed in claim 1, wherein the first threshold is between −10 mV and −20 mV.

3. The method as claimed in claim 2, wherein the second threshold is between +10 mV and +20 mV.

4. The method as claimed in claim 2, wherein the valve is configured to move when the pressure of the filtered gases is greater than or equal to 1 millibar or less than or equal to −11 millibar.

5. The method as claimed in claim 1, wherein the second threshold is between +10 mV and +20 mV.

6. The method as claimed in claim 5, wherein the valve is configured to move when the pressure of the filtered gases is greater than or equal to 1 millibar or less than or equal to −11 millibar.

7. The method as claimed in claim 1, wherein the valve is configured to move when the pressure of the filtered gases is greater than or equal to 1 millibar or less than or equal to −11 millibar.

8. A detection system configured to detect pinching or twisting of a discharge pipe connecting a fuel tank and an absorbent filter of an evaporation system of a motor vehicle, said detection system comprising:
  a controller; and a pressure regulating device mounted between the absorbent filter and the outside of the vehicle, the pressure regulating device comprising:
  a solenoid,
  a valve configured to move between a closed position, in which the valve prevents the gases from passing through the pressure regulating device, and an open position, in which the valve allows the gases to pass from the tank or to the tank, movement of the valve then defining a voltage at terminals of the solenoid when said solenoid is not controlled electrically, and
  a measurement module configured to measure the voltage generated at the terminals of the solenoid to obtain measurements and to send the measurements to the controller,
wherein the controller is configured to receive the measurements taken by the measurement module during a movement of the valve from the closed position and to detect the pinching or the twisting of the discharge pipe when the received measurements are between a first predetermined threshold and a second predetermined threshold.

9. The detection system as claimed in claim 8, wherein the first threshold is between −10 mV and −20 mV.

10. The detection system as claimed in claim 9, wherein the second threshold is between +10 mV and +20 mV.

11. The detection system as claimed in claim 9, wherein the measurement module is mounted on the fuel tank of the vehicle, or integrated into the pressure regulating device or into the controller.

12. The detection system as claimed in claim 9, wherein the valve is configured to move when the pressure of the filtered gases is greater than or equal to 1 millibar or less than or equal to −11 millibar.

13. A motor vehicle comprising:
  the detection system as claimed in claim 9.

14. The detection system as claimed in claim 8, wherein the second threshold is between +10 mV and +20 mV.

15. The detection system as claimed in claim 14, wherein the measurement module is mounted on the fuel tank of the vehicle, or integrated into the pressure regulating device or into the controller.

16. The detection system as claimed in claim 14, wherein the valve is configured to move when the pressure of the filtered gases is greater than or equal to 1 millibar or less than or equal to −11 millibar.

17. The detection system as claimed in claim 8, wherein the measurement module is one of: (i) mounted on the fuel tank of the vehicle, and (ii) integrated into the pressure regulating device or into the control module.

18. The detection system as claimed in claim 17, wherein the valve is configured to move when the pressure of the filtered gases is greater than or equal to 1 millibar or less than or equal to −11 millibar.

19. The detection system as claimed in claim 8, wherein the valve is configured to move when the pressure of the filtered gases is greater than or equal to 1 millibar or less than or equal to −11 millibar.

20. A motor vehicle comprising:
  the detection system as claimed in claim 8.

* * * * *